United States Patent
Ivanov et al.

(10) Patent No.: US 7,941,789 B2
(45) Date of Patent: *May 10, 2011

(54) COMMON PERFORMANCE TRACE MECHANISM

(75) Inventors: Ventsislav I. Ivanov, Sofia (BG); Hristo I. Dobtchev, Sofia (BG)

(73) Assignee: SAP AG, Walldorf (DE)

( * ) Notice: Subject to any disclaimer, the term of this patent is extended or adjusted under 35 U.S.C. 154(b) by 1056 days.

This patent is subject to a terminal disclaimer.

(21) Appl. No.: 11/529,978

(22) Filed: Sep. 29, 2006

(65) Prior Publication Data

US 2008/0127108 A1    May 29, 2008

(51) Int. Cl.
 G06F 9/44    (2006.01)
(52) U.S. Cl. .......................... 717/128; 714/45
(58) Field of Classification Search .................. 717/128; 714/45
See application file for complete search history.

(56) References Cited

U.S. PATENT DOCUMENTS

| | | | |
|---|---|---|---|
| 5,371,883 A | 12/1994 | Gross et al. | |
| 5,642,478 A * | 6/1997 | Chen et al. | 714/45 |
| 5,896,536 A * | 4/1999 | Lindsey | 717/128 |
| 6,202,199 B1 * | 3/2001 | Wygodny et al. | 717/125 |
| 6,526,371 B1 * | 2/2003 | Klein et al. | 702/186 |
| 6,658,416 B1 * | 12/2003 | Hussain et al. | 1/1 |
| 6,678,883 B1 * | 1/2004 | Berry et al. | 717/128 |
| 6,708,173 B1 * | 3/2004 | Behr et al. | 1/1 |
| 6,766,511 B1 * | 7/2004 | Berry et al. | 717/128 |
| 6,802,054 B2 | 10/2004 | Faraj | |
| 7,003,781 B1 | 2/2006 | Blackwell et al. | |
| 7,140,025 B1 | 11/2006 | Dillow et al. | |
| 7,165,190 B1 * | 1/2007 | Srivastava et al. | 714/38 |
| 7,194,664 B1 * | 3/2007 | Fung et al. | 714/45 |
| 7,200,588 B1 * | 4/2007 | Srivastava et al. | 1/1 |
| 7,337,349 B2 | 2/2008 | Brauneis, Jr. et al. | |
| 7,380,239 B1 * | 5/2008 | Srivastava et al. | 717/128 |
| 7,392,505 B2 | 6/2008 | Ciapala et al. | |
| 7,441,234 B2 * | 10/2008 | Cwalina et al. | 717/128 |
| 7,640,459 B2 * | 12/2009 | Ivanov et al. | 714/45 |
| 2003/0009507 A1 | 1/2003 | Shum | |
| 2003/0061550 A1 | 3/2003 | Ng et al. | |
| 2003/0065764 A1 * | 4/2003 | Capers et al. | 709/224 |
| 2003/0088854 A1 * | 5/2003 | Wygodny et al. | 717/130 |
| 2003/0212928 A1 | 11/2003 | Srivastava et al. | |
| 2004/0010570 A1 | 1/2004 | Kaler et al. | |
| 2004/0117768 A1 | 6/2004 | Chang et al. | |
| 2004/0153881 A1 | 8/2004 | Arend | |
| 2004/0158819 A1 * | 8/2004 | Cuomo et al. | 717/128 |

(Continued)

OTHER PUBLICATIONS

Harkema et al. University of Twente Netherlands, "Performance Monitoring of Java Applicaionts" Jul. 2002, (Harkema.pdf).*

(Continued)

*Primary Examiner* — Emerson C Puente
*Assistant Examiner* — Hiren Patel
(74) *Attorney, Agent, or Firm* — Blakley, Sokoloff, Taylor & Zafman LLP

(57) ABSTRACT

A method for providing a mechanism for generating a common format for trace data is disclosed. In one embodiment, the method includes generating trace data at a plurality of providers, the trace data including a first trace data having a first format and a second trace data having a second format, receiving the trace data at a database via a common interface, storing the trace data at the database in compliance with a common format, and providing access to the trace data stored at the database via a user interface.

9 Claims, 13 Drawing Sheets

U.S. PATENT DOCUMENTS

| | | | |
|---|---|---|---|
| 2004/0194066 A1* | 9/2004 | Frey et al. | 717/127 |
| 2004/0210877 A1* | 10/2004 | Sluiman et al. | 717/130 |
| 2004/0220947 A1 | 11/2004 | Aman et al. | |
| 2005/0060408 A1 | 3/2005 | McIntyre et al. | |
| 2005/0091373 A1 | 4/2005 | Ciapala et al. | |
| 2005/0120341 A1 | 6/2005 | Blumenthal et al. | |
| 2005/0132337 A1* | 6/2005 | Wedel et al. | 717/128 |
| 2005/0283673 A1 | 12/2005 | Ode | |
| 2006/0015612 A1 | 1/2006 | Shimazaki et al. | |
| 2006/0085798 A1 | 4/2006 | Bendiksen et al. | |
| 2006/0229064 A1* | 10/2006 | Pitkamaki et al. | 455/414.3 |
| 2006/0288149 A1 | 12/2006 | La Vigne et al. | |
| 2007/0143795 A1* | 6/2007 | Tran | 725/46 |
| 2007/0260668 A1 | 11/2007 | Chen et al. | |
| 2008/0098358 A1 | 4/2008 | Shekov | |
| 2008/0098359 A1* | 4/2008 | Ivanov et al. | 717/128 |
| 2008/0127108 A1* | 5/2008 | Ivanov et al. | 717/128 |
| 2008/0127110 A1* | 5/2008 | Ivanov et al. | 717/128 |
| 2008/0155348 A1* | 6/2008 | Ivanov et al. | 714/45 |
| 2008/0155349 A1* | 6/2008 | Ivanov et al. | 714/45 |
| 2008/0155350 A1* | 6/2008 | Ivanov et al. | 714/45 |

OTHER PUBLICATIONS

Turner et al. IBM TJ Watson Research Center, "Application Response Measurement Of Distributed Web Services", 2002, (Turner.pdf).*

Office Action for U.S. Appl. No. 11/540,028, mailed Mar. 26, 2010, 29 pages.

Borgeest, Rolf, et al., "A trace based performance evaluation tool for parallel real time systems", Nov. 2, 1994, 14 Pages.

Dufour, Bruno, et al., "J: A Tool for Dynamic Analysis of Java Programs", *McGill University*, Oct. 2003, 2 Pages.

Non-Final Office Action for U.S. Appl. No. 11/540,348, Mailed Jan. 22, 2010, 18 Pages.

Non-Final Office Action for U.S. Appl. No. 11/541,119, Mailed Feb. 4, 2010, 19 Pages.

Non-Final Office Action for U.S. Appl. No. 11/540,028, Mailed Mar. 26, 2010, 29 Pages.

Final Office Action for U.S. Appl. No. 11/540,348, Mailed Jun. 23, 2010, 15 Pages.

Final Office Office Action for U.S. Appl. No. 11/540,028, Mailed Jul. 30, 2010, 16 Pages.

Final Office Action for U.S. Appl. No. 11/541,119, Mailed Aug. 2, 2010, 16 Pages.

Final Office Action for U.S. Appl. No. 11/529,980, Mailed Aug. 4, 2010, 17 Pages.

Non-Final Office Action for U.S. Appl. No. 11/529,980, Mailed Apr. 26, 2010, 23 Pages.

* cited by examiner

COMMON PERFORMANCE TRACE MECHANISM

FIELD

Embodiments of the invention generally relate to the field of tracing. More particularly, the embodiments of the invention relate to providing a common performance trace mechanism.

BACKGROUND

As application development projects are growing larger, tracing is becoming increasingly important. Tracing can be a very useful tool used primarily by software developers to isolate problems, for example, by tracking execution of program code. For example, when developing an application, developers trace the execution of methods or functions within certain modules to identify problems and/or to determine if the program code may be improved. If a particular method takes an inordinate amount of time to complete, the developer may determine the reasons why and/or change the program code to operate more efficiently.

Trace tools are proprietary application programs which use different techniques to trace the execution flows for an executing program. One technique, referred to as event-based profiling, tracks particular sequences of instructions by recording application-generated events as they occur. By way of example, a trace tool may record each entry into, and each exit from, a module, subroutine, function, method, or system component within a trace file (e.g., a time-stamped entry may be recorded within the trace file for each such event). Trace events may also be sent to a console or other output destination.

Conventional trace tools, however, are limited with tracing data from various systems, i.e., when dealing with tracing data of various structures. For example, conventional trace tools do not provide for integration of various trace files of different structures relating to different corresponding systems. This often leads to, at best, delay in reading of errors as the data has to be manually read and, at worst, misreading of errors or even loss of trace data. Tracing is particularly cumbersome when a development project involves a great number of systems, applications, components, modules, developers, and/or multiple interfaces and services.

SUMMARY

According to one embodiment, a method for providing a mechanism for generating a common format for trace data is disclosed. The method includes generating trace data at a plurality of providers, the trace data including a first trace data having a first format and a second trace data having a second format, receiving the trace data at a database via a common interface, storing the trace data at the database in compliance with a common format, and providing access to the trace data stored at the database via a user interface.

Other embodiments are also disclosed. Further, the above attributes may be implemented using a computer program, a system, or an apparatus, or any combination thereof. These and other details of one or more embodiments of the present invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Figure 1:
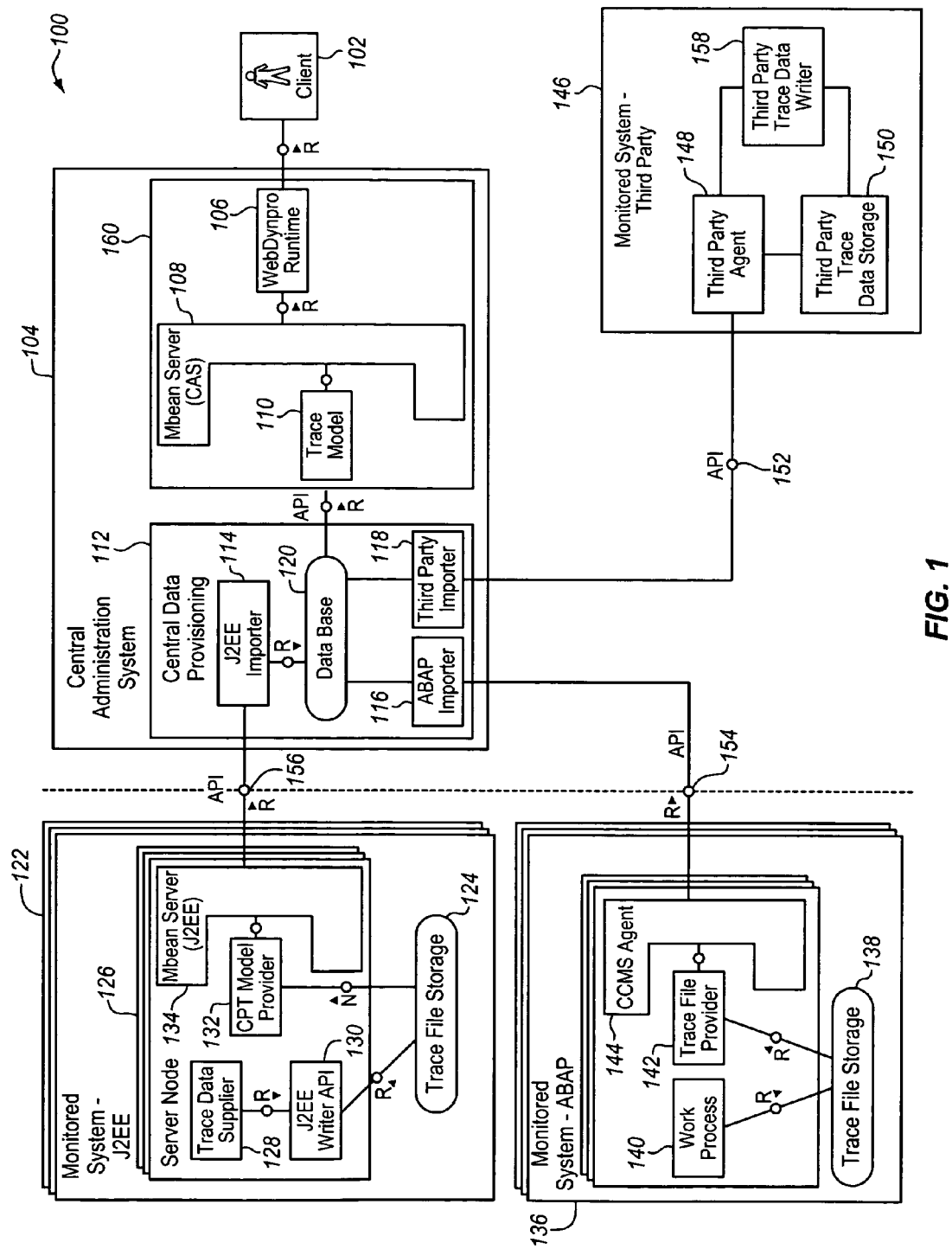
FIG. 1 illustrates an embodiment of a common performance trace architecture.

FIG. 1 illustrates an embodiment of a common performance trace (CPT) architecture 100. In one embodiment, central administration system (CAS) 104 is employed coupled with monitored systems 122, 136, 146, such as a Java 2. Enterprise Edition (J2EE) system 122, an Advanced Business Application Programming (ABAP) system 136, and a third party system 146 via various application programming interfaces (APIs) 152-156. The trace data is retrieved from the remote systems using various APIs and transport protocols (like HTTP, RFC). It is contemplated that any number and type of monitored systems may be coupled with CAS 104. CAS 104 receives trace data from various monitored systems 122, 136, 146 and collectively provides the trace data in a common structure or format (e.g., CPT format) at database 120. Having a common structure or format for trace data allows the user to choose the data provider or monitored system 122, 136, 146 that meets the requirements or needs in light of changes to one or more applications, program codes, etc. A CPT format includes a format for common performance trace events that unifies different types, structures, and formats of performance data, such as the ones obtained from a structure query language (SQL) trace, a J2EE server performance trace (e.g., from a J2EE system 122, a ABAP server performance trace (e.g., from an ABAP system 136), and the like (e.g., from a third party system 146).

In one embodiment, CPT architecture 200 provides a mechanism for persisting and analyzing performance traces from various monitored systems 122, 136, 146. A performance trace refers to a special trace type that deals with performance issues of applications and program codes, such as like call durations, call stacks, memory consumption, amount of transferred data, and the like. CPT architecture 200 may consist of common data format, trace data providers, central analysis services, generic reports, and the like. CPT architecture 200 further provides a library that provides one or more APIs (e.g., CPT API) to give access to CPT files and database 120. A CPT API refers to an interface that allows for generation and persistence of performance trace data, which complies with the CPT format that is provided via CAS 104 and stored at CPT database 120, and manages various CPT processes as discussed elsewhere in this document. In one embodiment, a trace correlator is employed at CAS 104. A trace correlator includes an object that is used to analyze trace records, which are obtained from different, software components, physical locations (e.g., hosts) and at different times. A trace correlator helps define a semantic group, which is useful to understand how various traces belong together. Also, distributed statistics may be used that refer to a minimum performance trace, which continuously runs with a running system, such as monitored systems 122, 136, 146. It may be aggregated offline to statistical aggregates and analyzed with respect to performance, accounting, hardware sizing, system usage profiles, and the like.

CAS 104 is in communication with client 102. CAS 104 includes Mbean server 105 that is registered with CAS 104. Further, display application or user interface (UI) 106 (e.g., WebDynPro Runtime) is employed. In one embodiment, a program code is instrumented that creates trace data supplier to write performance trace data via CPT API 152-156 to database 120. Trace model 110 that is in communication with Mbean server 108 and database 120 allows accessing of trace data at database 120 via UI 106 by providing a merged trace data received from multiple monitored systems 122, 136, 146 via corresponding trace data importers 114-118 located at central data provisioning 112. Trace model 110 also provides for filtering and aggregation of trace data. To allow for proper access and analysis of trace data originating from multiple sources 112, 136, 146, the trace data is converted into a common format or structure (e.g., CPT format, CPT structure, etc.) and provided to the user via client 102 further via UI 106.

Various modules and components are employed at monitored systems 122, 136, 146 to facilitate tracing and for collection, processing, and exporting of trace data. For example, J2EE monitored system 122 includes trace file storage 124 and server node 126, which includes trace data supplier 128, model provider 132, writer API 130, and Mbean server 134. In one embodiment, model provider 132 is implemented as MBean registered to the local system MBean server 134 and allows the accessing of trace data from CAS 104. Trace file storage 124 is referred to as a CPT file that serves as a temporary storage for trace data at monitored system 122. Trace data supplier 128 is a source of trace data, while write API provides a CPT API for trace data writing and serves as a CPT tracer.

ABAP monitored system 136 include a Computer Center Management System (CCMS) agent 144 that allows CCMS to access trace data for the local ABAP system 136. The trace data is provided to CCMS agent 144 via trace file provider 142 and stored at trace file storage 138 and received using work process 140. The trace data is retrieved from ABAP monitored system 136 and exported to CAS 104 by performing RFC calls to CCMS via CCMS agent 144. The trace data is imported at CAS 104 via ABAP CCMS importer 116 and then stored at database 120. In one embodiment, a number of systems can be monitored and trace data from such systems may be provided to CAS 104 so that it can then be converted into and provided as a common CPT structure trace data for access and analysis by client 102. For example, a third party monitored system 146 is illustrated that includes various third party compatible functional modules and components to collect trace data and provide it to CAS 104. Such modules may include a third party trace data writer 158, a third party agent 148, and a third party trace storage 150 to perform their respective functions as with modules and components at other monitored systems 122, 136. Further, a third party importer 118 at CAS 104 is employed to import trace data from the third party monitored system 146.

In one embodiment, CPT architecture 100 provides a CPT format and correlation. The CPT format is CIM-compliant and provides a common format to perform traces to (1) define the type of data that is needed to analyze performance and/or functional problems, (2) allow for common central storage of trace data at database 120, which provides a common mechanism for persistence, management, and analysis, and (3) provide for correlation. Correlation allows for grouping (e.g., correlating) of trace records that belong to a single logical transaction by introducing a correlation, which is an abstract object. CPT architecture 100 further provides for selective and centralized switch of tracing data for involved components and traces types and structures. In one embodiment, the CPT reports of trace data may be implemented using UI application framework 106, such as the WebDynpro framework. The trace data is stored at database 120 using trace model 110 implemented as Mbean and registered with Mbean server 108 of CAS 104. Trace model 110 provides trace data both as race trace records and aggregated data.

In one embodiment, a user activity triggers requests that are processed by various components at monitored systems 122, 136, 146 and CAS 104. For example, a web request from client 102 is sent to a J2EE application server associated with J2EE monitored system 136. Similarly a request may be sent to other system, such as ABAP system 136 and any other third party system 146. Components at various systems 122, 136, 146 produce different traces appropriate for analyzing several functional and performance problems. Abstract correlator objects are introduced to allow end-to-end analysis of applications and user activities that are processed by components running at various systems 122, 136, 146. Such correlator objects provide for combining performance and trace data from different origins, such as different system 122, 136, 146, (2) serializing the trace data over a network and transferring the trace data to CAS 104 via the metadata of various communication protocols, and (3) providing the trace data via a common structure to provide performance activities of applications, program codes, and user activities that are being monitored and analyzed.

Figure 2A:
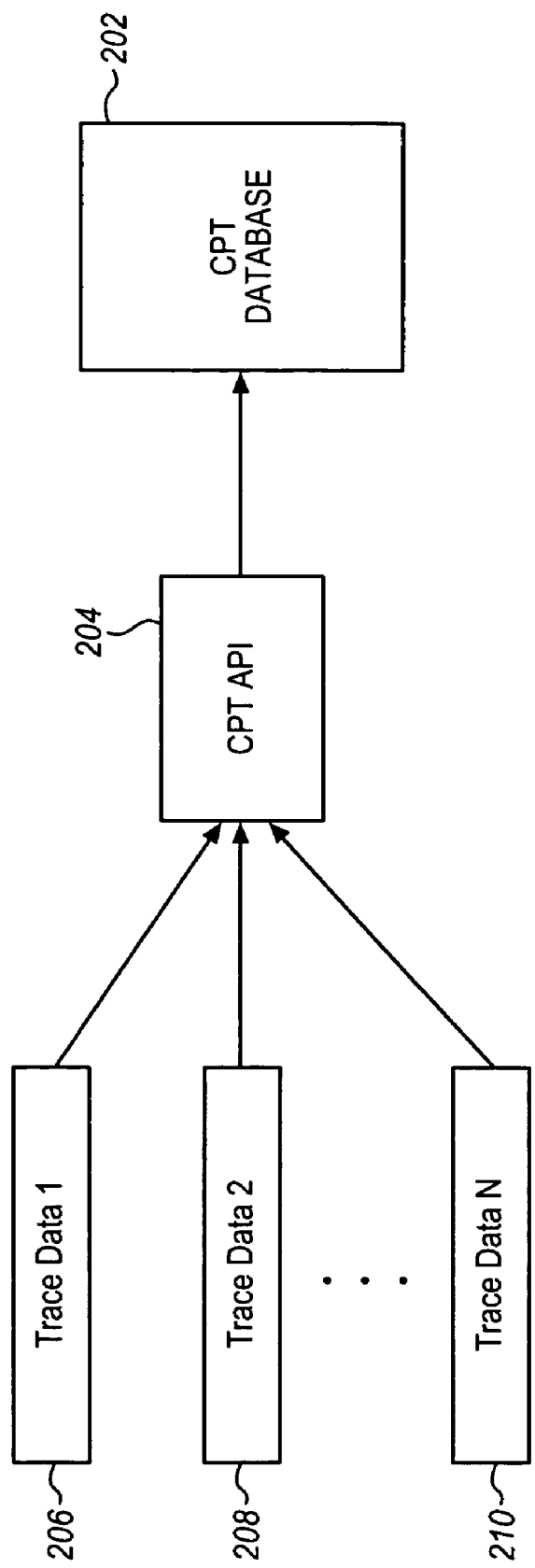
FIG. 2A illustrates an embodiment of a common performance test application programming interface.

FIG. 2A illustrates an embodiment of a common performance test application programming interface 204. In one embodiment, trace data 206-210 is collected from various trace data sources or providers (e.g., systems 122, 136, 146 of FIG. 1) and then provided to CPT database (e.g., database 120 of FIG. 1) at central administration system (e.g., CAS 104 of FIG. 1) via CPT API 204. CPT API may be associated with any number of modules and components, such as importers, writers, etc., to provide a way for trace data 206-210 to be provided at CPT database 202. CPT includes two development components: (1) a core library and (2) a service. The core library exposes CPT API 204 that allows instrumentation for writing performance traces by various components. The service is to configure CPT API 204 and view the gathered performance data.

CPT API 204 enables the currently existing functionalities in tracing (e.g., SQLTrace). Such functionalities include (1) reading trace data in an appropriate format for the corresponding application (e.g., OpenSQLMonitors application), (2) writing a trace record (together with metrics) is an atomic operation, (3) allowing the writing of trace data to a non database storage, and allowing the writing of trace data at server startup. Objects associated with CPT API 204 that are used for direct instrumentation of a trace data provider include (1) a factory object (e.g., CPTFactory) that is responsible for generating CPT provider objects via configuration, (2) a provider object (e.g., CPTProvider) which is used by the instrumented code to provide a lookup action and metric definition objects that are defined in the configuration thus identifying a single trace data provider, (3) a record object (e.g., CPTRecord) that is used as a main entity to be persisted via CPT API 204. Record objects contain performance information for measured action.

Each trace record that is received from various providers (e.g., monitored systems) is then configured to a common structure (e.g., CPT structure) and is stored at database 202. A CPT trace record may contain any number of metrics. Such metrics are valued from the instrumented code at data providers (e.g., monitored systems) and are assigned to the CPT trace record by calling a particular API method, such as an API addMetric( ) method. If necessary, a CPT trace record may be extended. CPT configuration may be separated in two parts: static configuration and dynamic (online) configuration. The two configurations may be regarded as two different use cases. A static configuration file may be part of CPT API 204 and used for such initialization of CPT API 204 so it can be directly used by the data providers by having the static configuration contain default CPT writer settings. Static configuration is also used to predefine certain objects, such as application layers, system layers, and database layers, etc. Also, the static configuration defines certain general metric definitions, such as elapsed time, central processing unit (CPU) time, and memory allocation that are relevant for various types of performance traces. A dynamic configuration file is part of the component that provides performance trace data. The dynamic configuration file may contain provider specific configurations, like actions and metric definitions.

In one embodiment, CPT API 204 is initialized by a J2EE engine service where the currently existing performance trace service is to be extended with various functionalities. The performance trace service provides various correlators, such as a measurement correlator that is regarded as the main correlator and is used to group up trace records belonging to a certain measurement or trace. The measurement correlator is referred to as the parent correlator to other correlators that are additionally provided. Another correlator includes a J2EE Engine runtime info correlator that contains information about the corresponding J2EE Engine user/session/application. The origin of CPT trace records is at a monitored system, such as at a node of a J2EE server associated with a J2EE system. To achieve a writing performance trace at server startup, a default correlator is employed for each virtual machine (VM). Default correlators may not contain any data relating to the monitored system. Further, for each trace data provider or monitored system, a default layer may be defined. The default layer is then automatically assigned to CPT trace records belonging to the corresponding trace data provider.

Figure 2B:
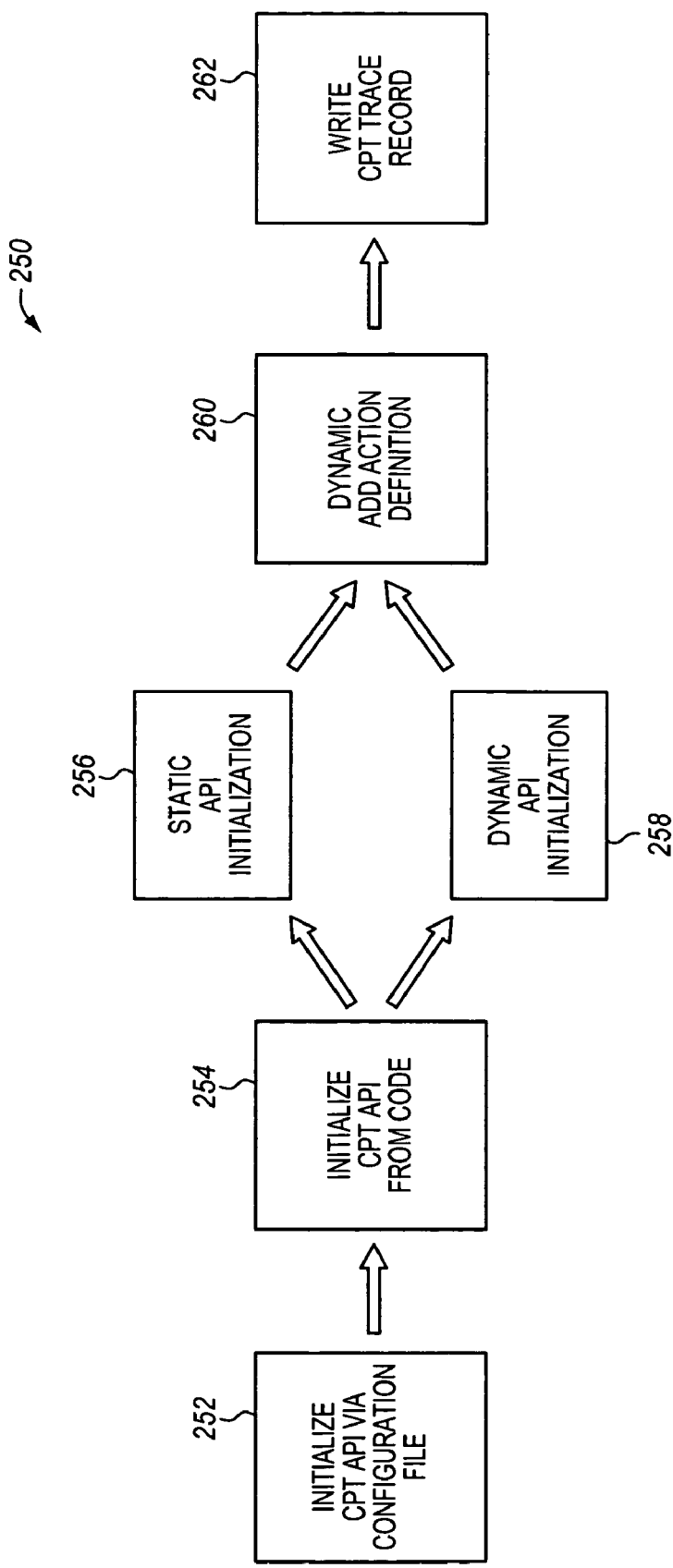
FIG. 2B illustrates an embodiment of a mechanism for using a common performance test application programming interface.

FIG. 2B illustrates an embodiment of a mechanism 250 for using a common performance test application programming interface. In one embodiment, CPT API is initialized 252 via a configuration file. The configuration file defines a provider that writes trace data in file storage. The configuration file further creates metric definitions of types, such as string, long, and double. CPT API is further initialized using a program code 254. CPT API allows the defining of a trace data provider using Extensible Markup Language (XML) configuration file or dynamically in the code. The CPT API initialization includes two types initializations: a static API initialization 256 and a dynamic API initialization 258. Various modules, components, and actions are defined dynamically defined 260 using a program code. An action may be for creating a CPT trace record. Then, a CPT trace record is written 262.

Figure 3:
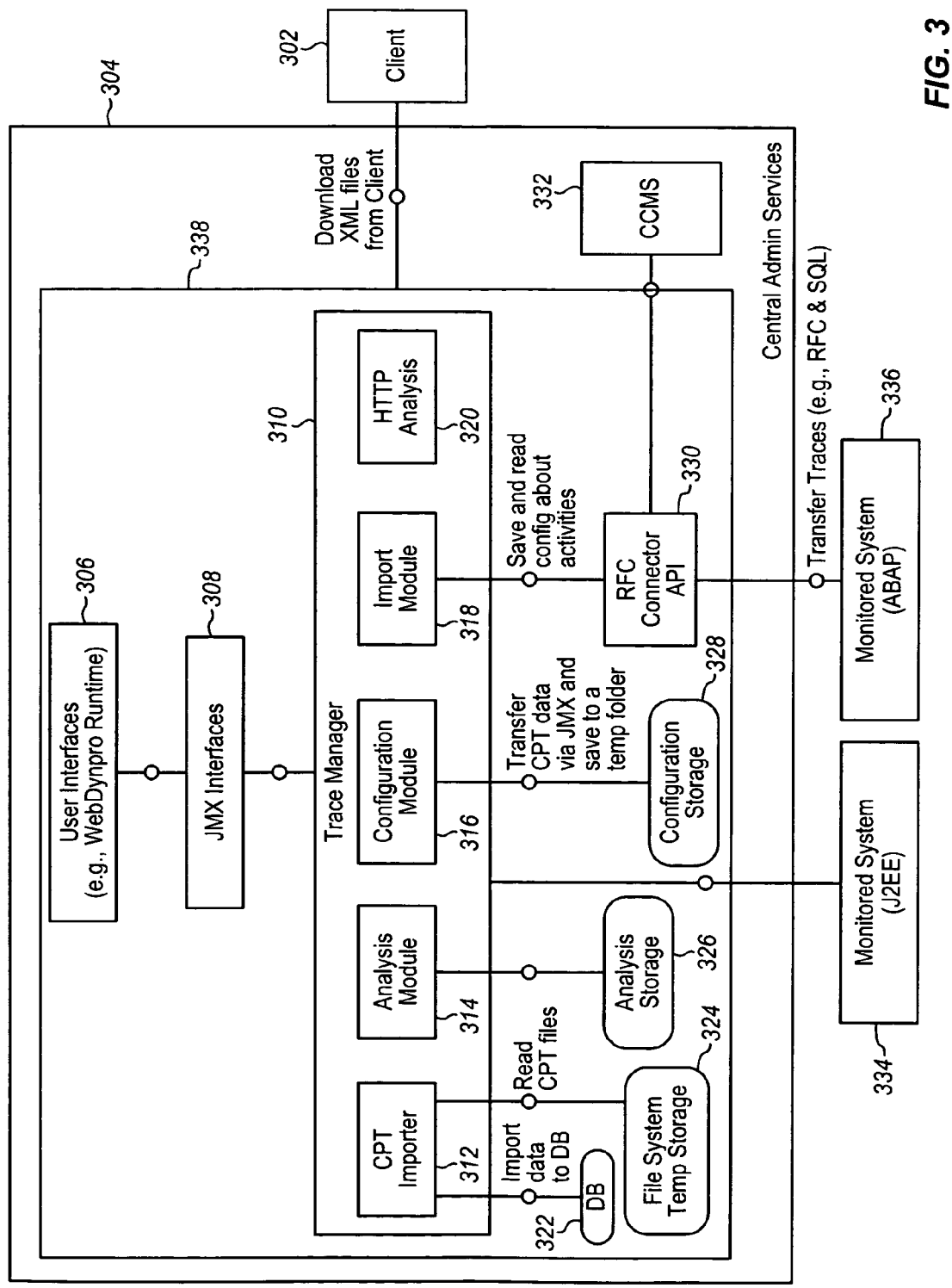
FIG. 3 illustrates an embodiment of a common performance trace architecture having a central administration system.

FIG. 3 illustrates an embodiment of a common performance trace architecture 300 having a central administration system 304. In one embodiment, CAS 304 is coupled to client 302 and systems that are being monitored for and are providers of trace data, such as J2EE monitored system 334 and ABAP monitored system 336. J2EE and ABAP system 334, 336 are coupled with CAS 304 via trace manager 310 that resides at CAS 304. Trace manager 310 is used to perform collection and analysis of trace data. Trace manager 310 is coupled to a UI 306 via Java Management Extensions (JMX) interfaces. Client 302 accesses trace information at trace manager 310 via a display application exposed via UI 306. For example, various XML files may be downloaded from client 302.

In one embodiment, trace data from J2EE and ABAP systems 334, 336 is imported at CAS 304 via various module and components, such as a CPT API and importers (e.g., CPT importer 312, import module 318, etc.). CPT importer 312 is used to import data from J2EE monitored system 334 and place it at database 322. The files having the trace data are first saved at file system 324 before being imported into database 322. Import module 318 may be used to import trace data from ABAP monitored system 336 and from any other system (such as the third party monitored system 146 of FIG. 1) and place it at database 322. For each ABAP trace, a reader class may be generated to be used to form an importer API of the CPT library. ABAP system 336 is in communication with trace manager 310 via RFC connecter API 330. RFC connecter API 330 serves as a proxy of RFC function modules and creates a general framework for connection to ABAP system 336. In addition to having and communicating with an ABAP system 336, a CCMS system 332 may also be added to CAS 304.

CAS 304 further includes configuration module 316 that contains methods for starting and stopping various trace activities, and for keeping general information (e.g., name, start data, end data, filters, etc.) about such activities. Configuration module 316 is in communication with configuration storage 328 where configuration data is stored. When a HyerText Transfer Protocol (HTTP) proxy is used on the client side, several XML files are generated as a result of that. These files are then uploaded to CAS 304 and with the help of a file (e.g., responses.trc file) that is generated by an HTTP service. Such HTTP analysis are generated and imported to CAS 304 via HTTP analysis module 320. Once trace activities are stopped and trace data form such activities are collected from monitored systems 334, 336 and imported into database 322, the trace data may then be kept at analysis storage 326 and analyzed by analysis module 314.

Figure 4:
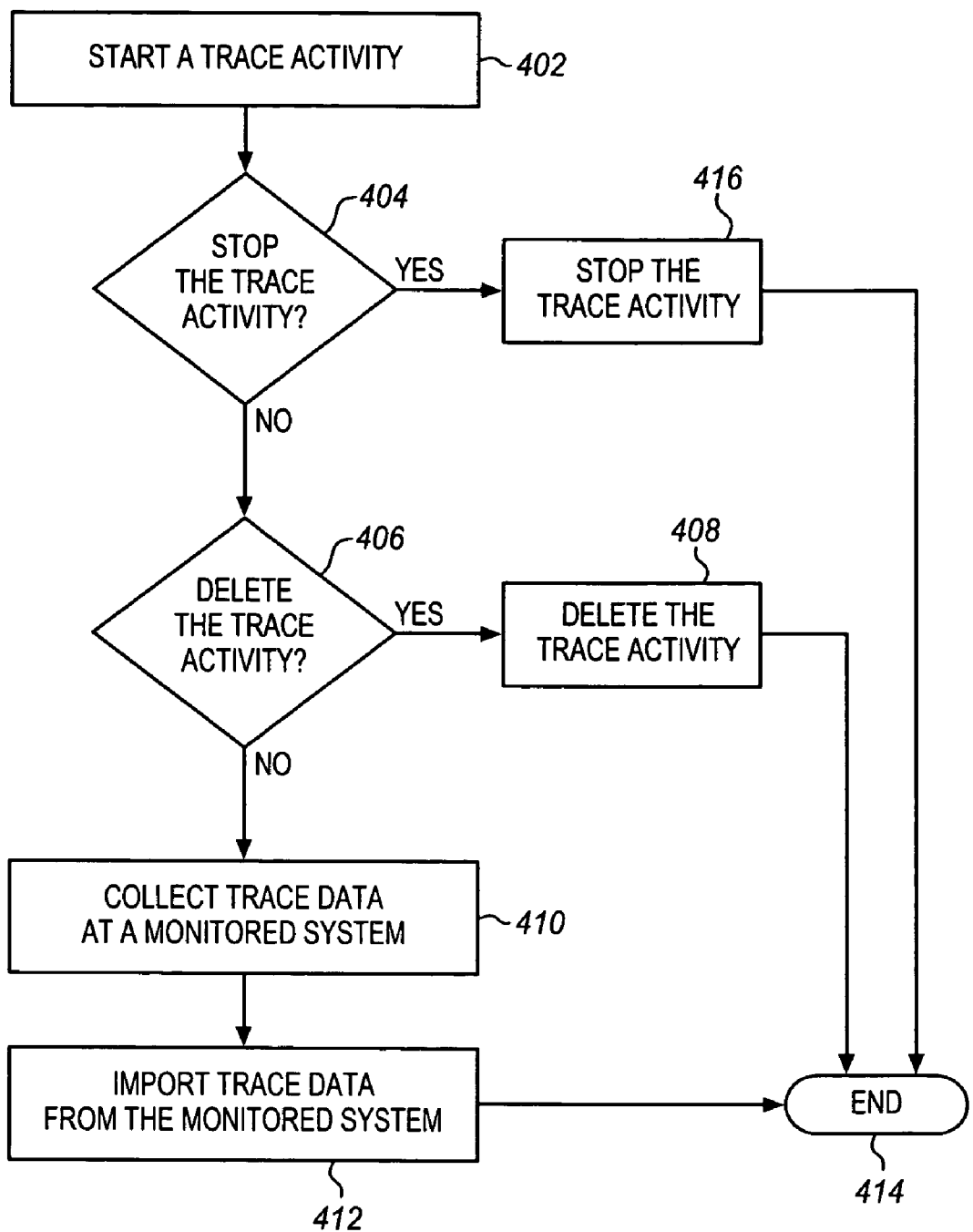
FIG. 4 illustrates an embodiment of a process for tracing and importing trace data.

FIG. 4 illustrates an embodiment of a process for tracing and importing trace data. At processing block 402, a trace activity is started such that program codes or applications at a system (e.g., J2EE system, ABAP system, etc.) can be monitored for trace data. It is contemplated that multiple trace activities may be started at multiple corresponding systems. In one embodiment, a user (e.g., administrator, developer, etc.) may select to start or generate the trace activity using system selection via a Web administration UI. For example, a Uniform Resource Locator (URL) is selected by the user at an Internet browser (e.g., Microsoft Explorer®, Netscape Navigator®) at a system. The user triggers the trace activity which then starts at a corresponding monitored system. At decision block 404, whether the trace activity is to be stopped is determined. If the trace activity is to be stopped, it is stopped at processing block 404 and the process ends at termination block 414. This can be triggered by the user via the UI. In case of multiple trace activities, the user may select to stop one or more trace activities, but not all of them. For example, the user my select to end the trace activity at a J2EE system, but continue with the ABAP and other systems. If the trace activity is not to be stopped, it continues with decision block 406.

At decision block 406, a determination is made as to whether the trace activity is to be deleted. If for any reason (e.g., incorrect application being traced, tracing data is correct, etc.), the trace activity at any given system is to be deleted at processing block 408, it is deleted and the process ends at termination block 414. This is can be accomplished by the user via the UI. In case of multiple trace activities, it is contemplated that one or more trace activities may be deleted, while still performing one or more other trace activities. If the trace activity is not to be deleted, the processing continues with collecting of trace data at the monitored system at processing block 410. When multiple trace activities are performed at multiple monitored systems, the trace data collected from each of those monitored systems may be of format and structure. For example, J2EE traces may be different in structure from ABAP traces. At processing block 412, the trace data is imported to a central database that provides a common structure of all trace data. The trace data having different structures is imported and converted into a common structure for the user to access and analyze at the central CPT database. This import may be performed via a number of CPT APIs, importers, import modules, temporary storages, and other modules and components. The process ends at processing block 414.

Figure 5:
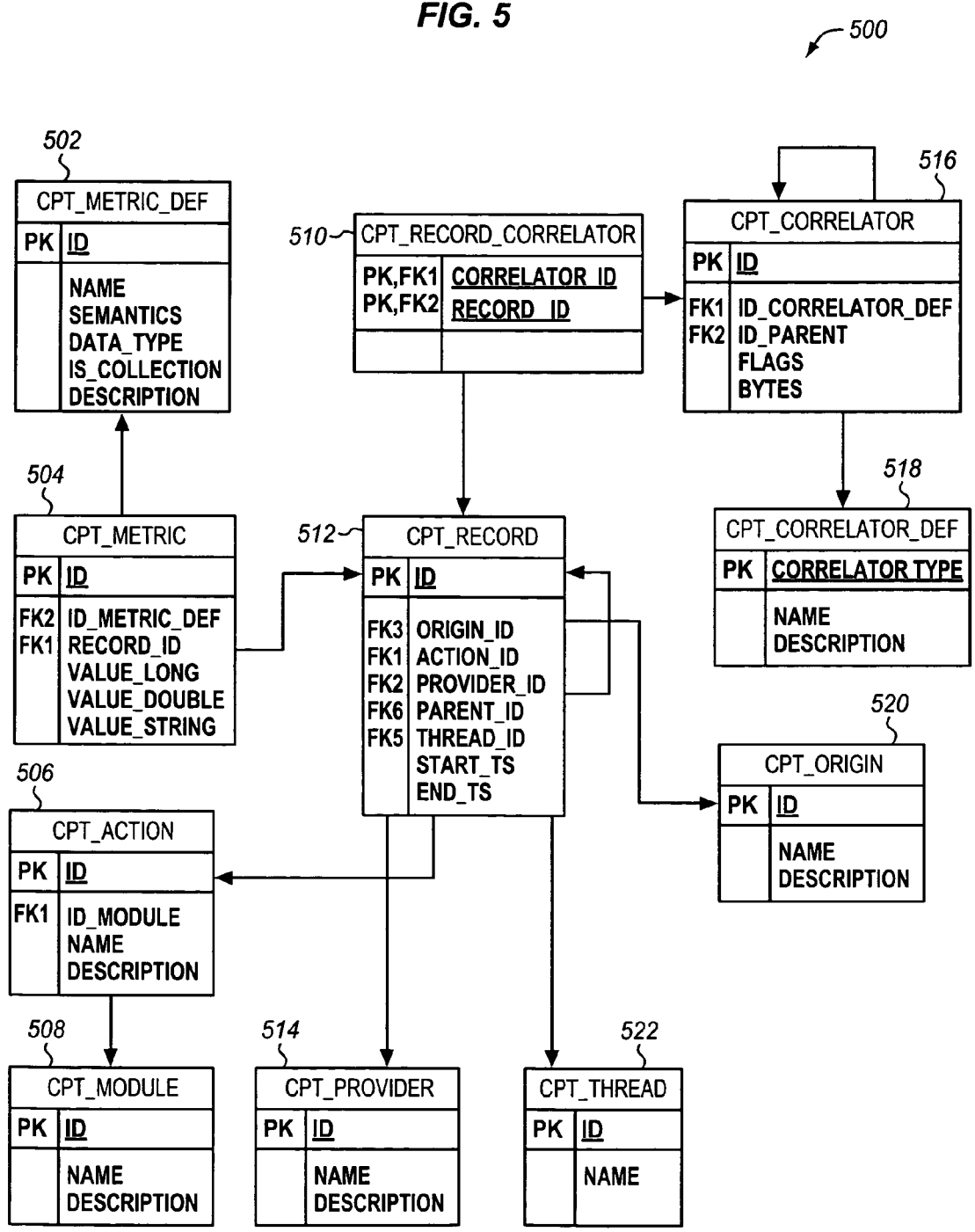
FIG. 5 illustrates an embodiment of a trace data structure represented at a common performance trace database.

FIG. 5 illustrates an embodiment of a trace data structure 500 represented at a common performance trace database. In one embodiment, a CPT API is used to store and manipulate trace data, including converting trace data of various formats and structures obtained from various monitored system into a common format/structure to be provided via a central CPT database. Once the import and conversion of trace data is performed from various systems to the CAS, the trace data is stored at the CPT database and represented in a special way such that the trace data is easily retrieved and manipulated. In one embodiment, the CPT mechanism uses two types of storage systems. The first type of storage system includes a file storage that is used to store CPT trace during execution of certain functionalities (e.g., to record processes in execution, etc.). The other type of storage system includes a database storage (e.g., central CPT database) that is capable of being used for manipulating trace data (e.g., to retrieve specific records, to retrieve records with specified correlation or specified provider, etc.).

In the illustrated embodiment, the database storage of trace data is shown as having various modules, records, etc. For example, a CPT-compatible trace data format or structure contains a stream of six files, such as (1) file origins, (2) file metrics, (3) file correlators, (4) file metadata, (5) file record correlator, and (6) file records. Each of the elements 502-520 illustrated here are contained in one or more such streams of files. For example, CPT metric definition 502, which contains unique identification, may be contained in file metrics, but repeated in file origins. CPT origin 520 includes a node from where a record (e.g., CPT record 512) originates. CPT origin is found in file metadata and when combined with the unique identification from CPT metric definition 502 provides a global identification for the record 512. CPT module 508 provides the name of the logical unit (e.g., class name) corresponding to the record originated. CPT module 508 is contained in file metadata. CPT action 506, which is in communication with CPT module 508, provides the name (e.g., method name) of a module subsection which measures execution time.

CPT thread 522 provides a unique identification of the thread executing the module. CPT thread 522 is located in file metadata. CPT provider 514 is a provider of the record 512 and is contained in file metadata. Examples of trace data handled by a CPT provider 514 include SATrace, SQLTrace, APPTrace, etc. The providers, for example, may include SATrace, SQLTrace, APPTrace, etc. Based on the provider name, the visualizer can use plug-ins for additional processing. CPT record 512 includes the record that is originated, provided, and used and is associated with other elements 502-510, 514-522. CPT record 512 resides in file records. CPT record 512 may also include a parent identification which may be used when there is a nesting of trace records and may contain the identification of the parent record.

CPT metric 504 is located at file metrics. CPT metric 504 represents metrics having a set of (name=value) pairs giving additional information about a call. For example, CPT metric can describe a method call parameters, or in case of a database call, some database related values may be provided. These properties can be parsed by the visualizer to a provider specific plug-in or merely can be used as a more detailed description of the record 512. Trace data structure 100 further includes correlators, such as CPT record correlator 510 that resides at file record correlator, CPT correlator 516 that resides at file origins, and CPT correlator definition 518 that resides at file metadata. These correlators 510, 516, 518 provide a value that defines and provides to which measurement or trace the record 512 belongs. For each measurement, a separate correlator 510, 512, 512 may be defined.

Figure 6:
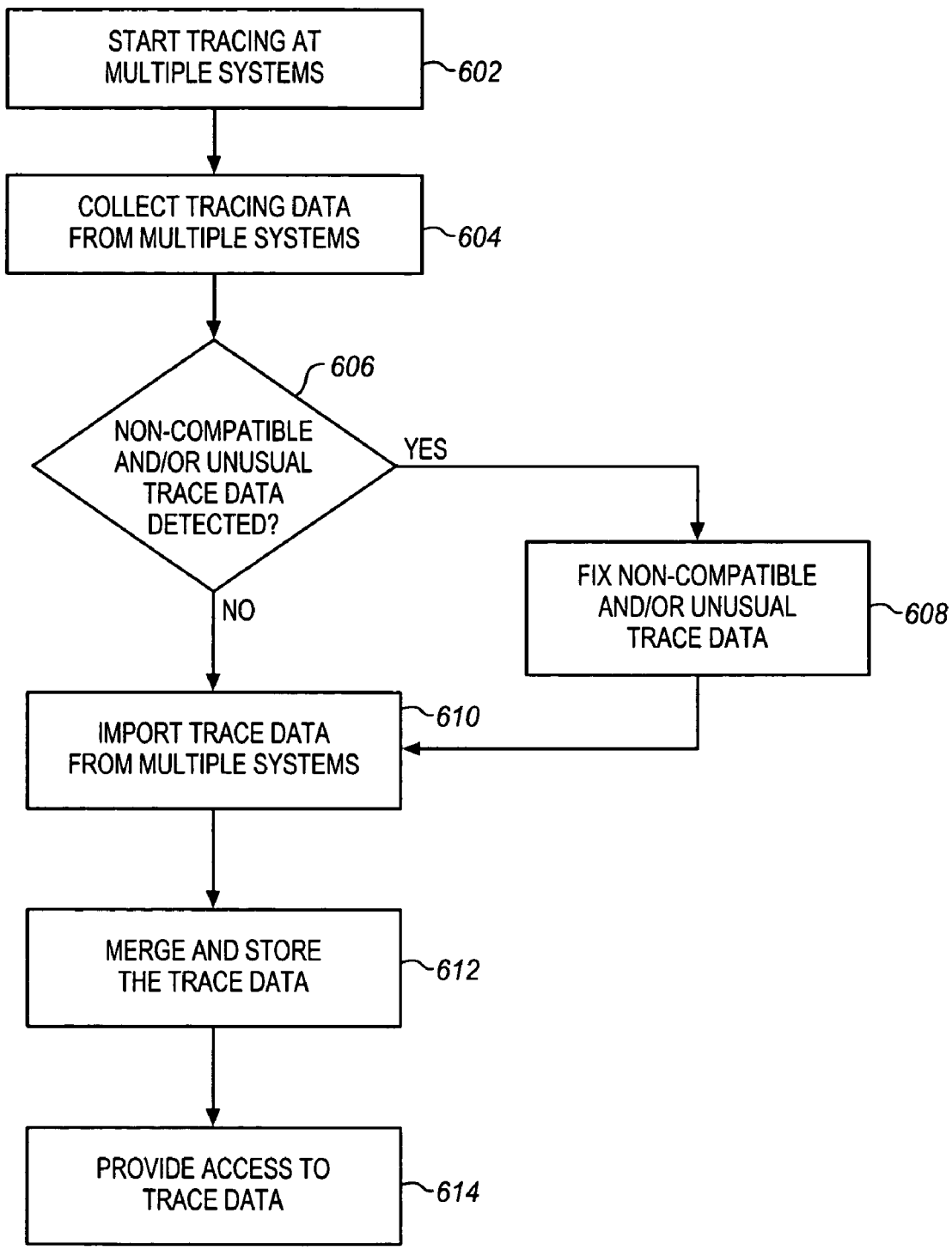
FIG. 6 illustrates an embodiment of a process for tracing at multiple systems and providing access to trace data.

FIG. 6 illustrates an embodiment of a process for tracing at multiple systems and providing access to trace data. In one embodiment, at processing block 602, tracing at multiple systems (e.g., J2EE system, ABAP system, etc.) is started. Tracing can be started by having a Web administration application (e.g., Web Dynpro application) run as triggered by a user via a client via a UI. Once tracing has started, tracing data from various monitored systems is collected at processing block 604. At decision block 606, whether any unusual or non-compatible trace data is being collected is determined. If there is such trace data (e.g., trace data that is not CPT compatible, flawed data, etc.), that trace data is fixed at processing block 608. Examples of the fixing of such trace data includes deleting any flawed data, stopping the tracing at one or more systems, converting the trace data that is not compatible with CPT into trace that is compatible with CPT, etc.

Once the non-compatible or unusual data is fixed or if not such trace data is found, the trace data collected is then imported from multiple systems at a database that is central to a central administration system that is compatible with CPT at processing block 610. As it is discussed elsewhere in this document, compatible trace data may be imported directed to the database via a CPT API, while the importing of other trace data (e.g., non-compatible data) may include the use of additional modules and components, such as an import module, a trace data conversion module, etc. Such trace data is then merged and stored at the database at processing block 612. At processing block 614, access to the trace data stored at the database is provided to the user via the client and the UI.

Figure 7:
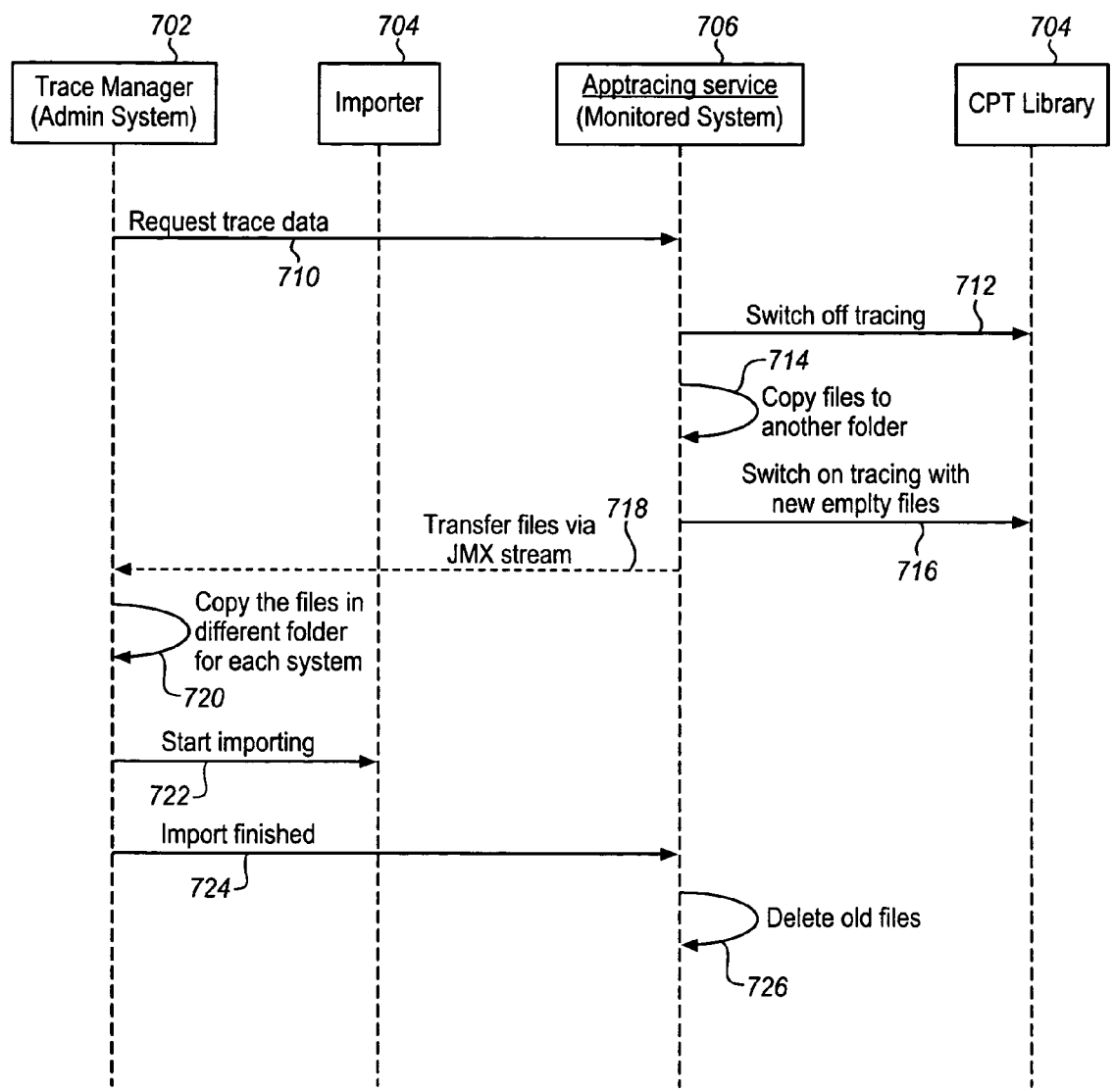
FIG. 7 illustrates an embodiment of a transaction sequence for requesting trace data while tracing.

FIG. 7 illustrates an embodiment of a transaction sequence for requesting trace data while tracing. A trace manager 702 (e.g., trace manager 310 of FIG. 3) at central administration system (e.g., CAS 304 of FIG. 3) issues a request for trace data 710 to a monitored system 706 (e.g., monitored systems 122, 136, 146 of FIG. 1). Once the request 710 is received, any further tracing is halted 712 and such is communicated from the monitored system 706 to a CPT library 708, which may be part of a CPT mechanism. Any current trace data files (e.g., CPT trace data files) are copied to another folder 714. Further tracing gets restarted with new empty files 716 to hold new trace data. The files are transferred 718 from the monitored system 706 to trace manager 702. These files are then copied in a different folder for each system 720, such as for each J2EE system. The trace manager 702 begins importing trace data 722 via an importer 704 and the process ends 724 once the trace data is obtained. The importer 704 may include a CPT import module that is provided via a CPT API 604 to import CPT-compatible trace data. The importer 704 may also include an import module that is employed in addition to and in communication with the CPT API to import the trace data that is not CPT-compatible. Any old files are then deleted 726.

Figure 8:
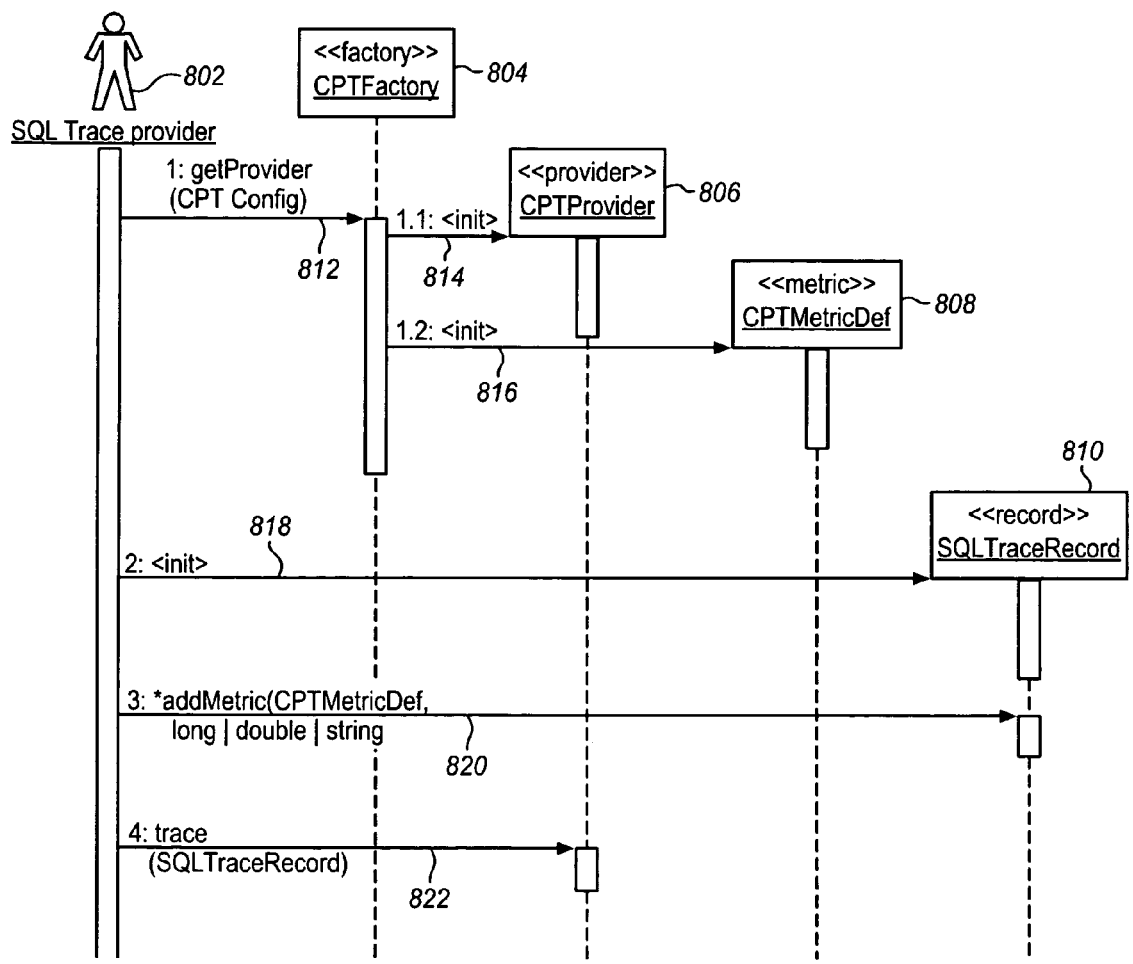
FIG. 8 illustrates an embodiment of a transaction sequence of using a common performance trace application programming interface.

FIG. 8 illustrates an embodiment of a transaction sequence of using a common performance trace application programming interface. In one embodiment, a CPT API may include a number of objects, metrics, a service, and a core library, to facilitate importing of trace data from various monitored systems to a database at central administration system that is part of a common performance mechanism. In the illustrated embodiment, an SQL trace provider 802 communicates provider CPT configuration with a CPT factory 804. A CPT provider 806 is initialized 814. A CPT trace provider 806 may be provided as Mbeans, such as stream buffer Mbean to transfer CPT files to the CAS. A folder containing trace files may be zipped and then the zip file may be transferred using JMX streams from monitored systems to trace manager of the CAS. The CPT trace provider 806 may also be provided as end to end trace Mbean that are used to set a system (e.g., J2EE system) in trace mode (to start the traces) and then after the stop of the trace to retrieve DSR passports. A CPT metric (e.g., CPT metric definition) 808 is then initialized 816. An SQL trace records 810 is then initialized 818 and a metric (e.g., CPT metric definition long) is added 820 to the SQL trace records 810. An SQL trace record is then provided 822 from an SQL trace component to the CPT provider 806.

Figure 9:
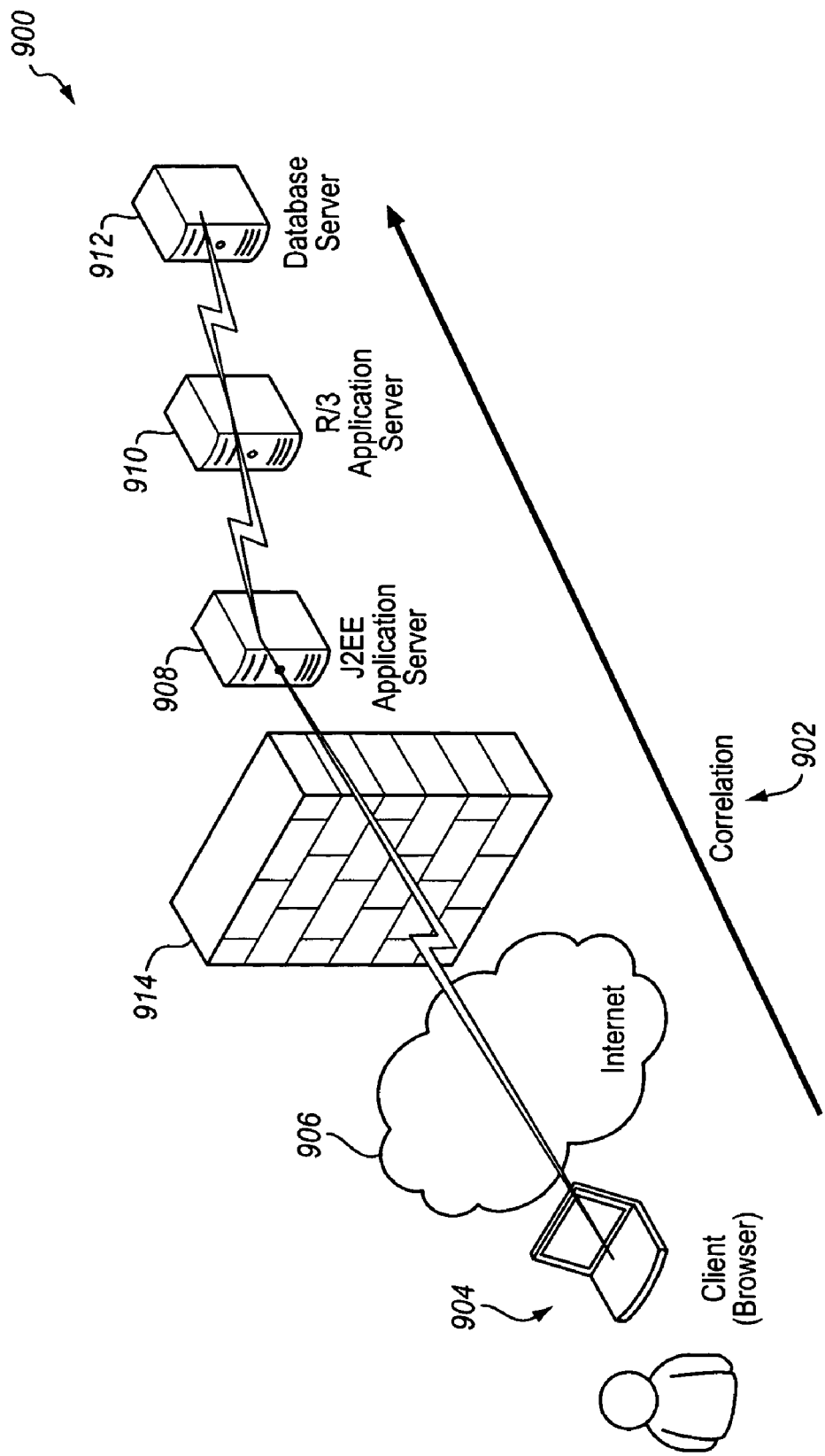
FIG. 9 illustrates an embodiment of a correlation mechanism.

FIG. 9 illustrates an embodiment of a correlation mechanism 900. When user activities trigger several requests that are processed by several components 904-912 in a landscape, this working of the several components 904-912 in concert with each other to process these requests is referred to as correlation 902. For example, a web request is placed by a user via client 904 and is communicated with J2EE application server 908 to render a UI in response. During the processing of this request, J2EE server 908 may one or more times call the corresponding ABAP (R/3) (backend) application server 910 where the application logic is implemented, while an ABAP application accessed a database via database server 912.

In one embodiment, each component 904-912 plays a role in correlation in providing various traces that are appropriate for analyzing various functional and performance problems. Abstract correlator objects may be introduced to allow an end-to-end analysis of user activities that are processed by many components running on different hosts. In one embodiment, correlator objects are used for combining performance and trace data from different origins, and representing user activities and containing information about it. Correlator objects are serialized over a network and transferred via metadata of communication protocols.

Figure 10:
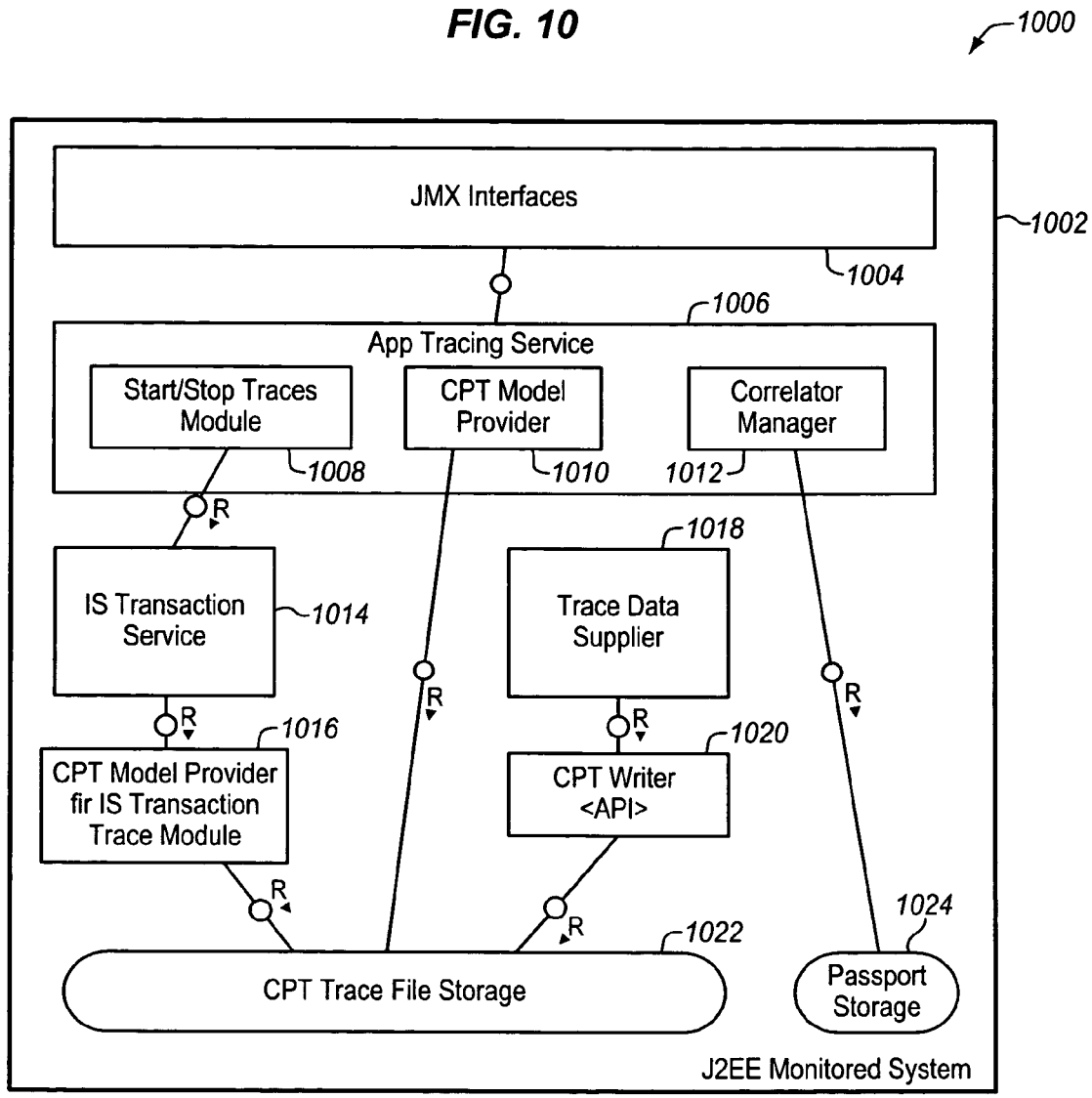
FIG. 10 illustrates an embodiment of a Java 2 Enterprise Edition monitored system.

FIG. 10 illustrates an embodiment of a Java 2 Enterprise Edition monitored system 1000. In the illustrated embodiment, J2EE monitored system 1000 (e.g., J2EE monitored system 122 of FIG. 1) includes certain components similar to those shown in FIG. 1, such as CPT trace file storage 1022, CPT writer and API 1020, CPT model provider 1010, etc. J2EE system 1000 further includes various JMX interfaces 1004 for JMX connections and trace data delivery to a central administration system. J2EE system 1000 includes application tracing service 1006 which further includes start/stop traces module 1008 to start and stop traces, correlation manger 1012 to provide a correlation of various components and systems. Traces are started when a request with trace parameters is received. Also, flags are set in the corresponding DSR passport.

In one embodiment, the start/stop traces module 1008 is associated with IS transaction service 1014 and CPT model provider for IS transaction trace module 1016 and further with CPT trace file storage 1022. CPT model provider for IS transaction trace module 1016 employs an API to trace its data to CPT files. CPT model provider 1010 provides methods for transferring CPT files to the central administration system using JMX streaming via JMX interfaces 1004. Correlator manager 1012 provides a module that is responsible for the creation of correlators for trace records.

In one embodiment, to perform various embodiments of the present invention, a server or node (e.g., J2EE server) is employed, which supports Enterprise Java Bean ("EJB") components and EJB containers (at the business layer) and Servlets and Java Server Pages ("JSP") (at the presentation layer). A virtual machine (VM), including a Java virtual machine (JVM), may be employed to host the server or server node. It is understood that processes taught by the discussion above can be practiced within various software environments such as, for example, object-oriented and non-object-oriented programming environments, Java based environments (such as a J2EE environment or environments defined by other releases of the Java standard), other environments (e.g., a .NET environment, a Windows/NT environment each provided by Microsoft Corporation), and the like.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

One or more modules within or associated with an enhanced configuration architecture (such as common performance trace architecture 100 of FIG. 1) and its sub-architectures and systems (e.g., central administration system 104), APIs (e.g., CPT API), and its modules, models, components, and other elements may include hardware, software, and a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above. The code may also be downloaded from a remote computer (e.g., a server) to a requesting computer (e.g., a client) by way of data signals embodied in a propagation medium (e.g., via a communication link (e.g., a network connection)).

Figure 11:
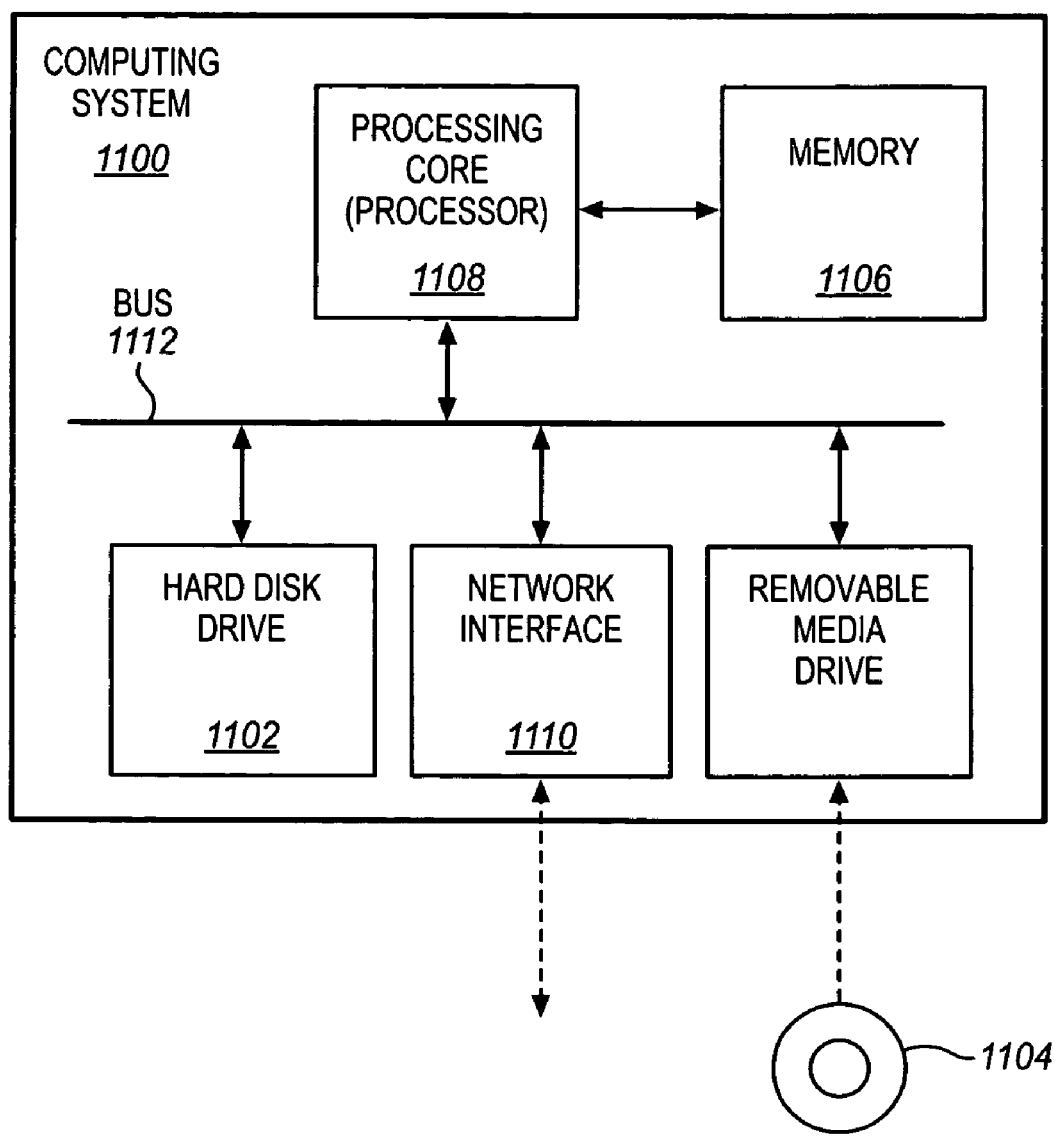
FIG. 11 illustrates a computing system.

FIG. 11 illustrates a computing system 1100. Computing system 1100 may be used for implementing one or more embodiments of the present invention and for executing program code stored by an article of manufacture. It is important to recognize that the computing system 1100 represents merely of various computing system architectures that can be used for the same purposes. The applicable article of manufacture may include one or more fixed components (such as hard disk drive 1102 or memory 1106) and/or various movable components, such as compact disk (CD) ROM 1104, a compact disc, a magnetic tape, and the like. To execute the program code, typically instructions of the program code are loaded into RAM 1106. Then, processing core 1108 executes the instructions. A processing core may include one or more processors and a memory controller function. A virtual machine or "interpreter" (e.g., a JVM) may run on top of the processing core (architecturally speaking) to convert abstract code (e.g., Java bytecode) into instructions that are understandable to the specific processor(s) of processing core 1108. Computing system 1100 further includes network interface 1110 and bus 1112 to connect to other systems via a network and to have various components communicate with each other, respectively.

Figure 12:
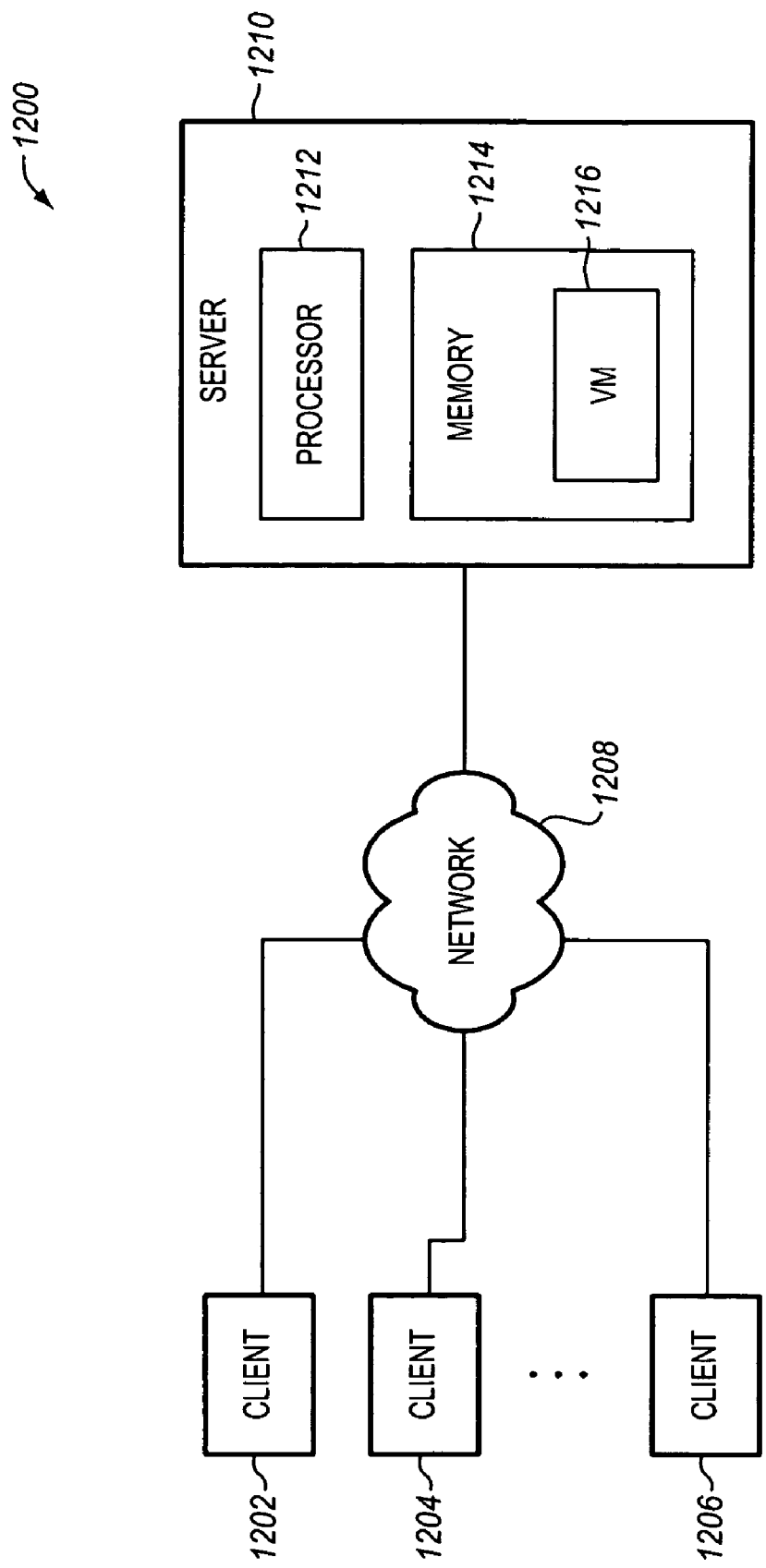
FIG. 12 illustrates a client/server network system.

FIG. 12 illustrates a client/server network system 1200. As illustrated, network 1208 links server 1210 with client systems 1202-1206. Server 1210 includes programming data processing system suitable for implementing apparatus, programs, and/or methods in accordance with one or more embodiments of the present invention. Server 1210 includes processor 1212 and memory 1214. Server 1210 provides a core operating environment for one or more runtime systems (e.g., VM 1216) at memory 1214 to process user requests. Memory 1214 may include a shared memory area that is accessible by multiple operating system processes executing in server 1210. For example, VM 1216 may include an enterprise server (e.g., a J2EE-compatible server or node, Web Application Server developed by SAP AG, WebSphere Application Server developed by IBM Corp. of Armonk, N.Y., and the like). Memory 1214 can be used to store an operating system, a Transmission Control Protocol/Internet Protocol (TCP/IP) stack for communicating over network 1208, and machine executable instructions executed by processor 1212. In some embodiments, server 1210 may include multiple processors, each of which can be used to execute machine executable instructions.

Client systems 1202-1206 may execute multiple application or application interfaces. Each instance or application or application interface may constitute a user session. Each user session may generate one or more requests to be processed by server 1210. The requests may include instructions or code to be executed on a runtime system, such as VM 1216, on server 1210 and its components and modules as described throughout this document.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:

receiving a request for a first trace data having a first trace format and associated with a first programming engine that is associated with first trace activities at a first computer system, and a second trace data having a second trace format and associated with a second programming engine that is associated with second trace activities at a second computer system, the first trace format being compatible with a common trace data format, wherein the second trace format is incompatible with and independent of the first trace format and the common trace data format, and wherein the first programming engine is incompatible with and independent of the second programming engine, wherein the common trace data format comprises a trace format that is designated as the common trace data format, the trace format including a common performance trace (CPT) format, wherein the (CPT) format includes a common interface model (CIM)-compliant format and provides the common trace data format defining a type of data that is needed to analyze performance;

analyzing the second trace data format of the second trace data for conversion to the common trace data format by determining compatibility or incompatibility of the second trace data with the common trace data format, wherein determining is performed based on correlators provided by a trace service, wherein the correlators include a first correlator containing engine information relating to the second programming engine, and a second correlator serving as a main correlator to group up trace records belonging to one or more traces;

converting the second trace format of the second trace data such that the second trace format is compatible with the common trace data format, wherein converting includes updating the trace service by replacing common trace data format-incompatible trace functionalities of the trace service with common trace data format-compatible trace functionalities;

integrating the first trace data having the first trace format with the second trace data having the converted second trace format; and providing access to the integrated first and second trace data.

2. The method of claim 1, further comprising:

identifying the second trace format of the second trace data being incompatible with the common trace data format;

importing, via an import module, the second trace data having the incompatible second trace format from the second trace data provider into a file system for temporary storage prior to the conversion; and transporting the second trace data having the converted second trace format to a database having the first trace data.

3. The method of claim 1, wherein the first programming engine comprises a Java 2 Enterprise Edition (J2EE) engine, and the second programming engine comprises an Advanced Business Application Programming (ABAP) engine.

4. A system comprising:

a data processing system having a processor coupled with a storage medium and a database, the data processing system having an application server employing a trace manager to:

receive a request for a first trace data having a first trace format and associated with a first programming engine that is associated with first trace activities at a first computer system, and a second trace data having a second trace data format and a second programming engine that is associated with second trace activities of a second computer system, the first format being compatible with a common trace data format, wherein the second trace format is incompatible with and independent of the first trace format and the common trace data format, and wherein the first programming engine is incompatible with and independent of the second programming engine, wherein the common trace data format comprises a trace format that is designated as the common trace data format, the trace format including a common performance trace (CPT) format, wherein the (CPT) format includes a common interface model (CIM)-compliant format and provides the common trace data format defining a type of data that is needed to analyze performance;

analyze the second trace data format of the second trace data for conversion to the common trace data format by determining compatibility or incompatibility of the second trace data with the common trace data format, wherein determining is performed based on correlators provided by a trace service, wherein the correlators include a first correlator containing engine information relating to the second programming engine and a second correlator serving as a main correlator to group up trace records belonging to one or more traces;

convert the second trace format of the second trace data such that the second trace format is compatible with the common trace data format, wherein converting includes updating the trace service by replacing common trace data format-incompatible trace functionalities of the trace service with common trace data format-compatible trace functionalities;

integrate the first trace data having the first trace format with the second trace data having the converted second trace format; and provide access to the integrated first and second trace data.

5. The system of claim 4, wherein the trace manager is further to: identify the second trace format of the second trace data being incompatible with the common trace data format;

import, via an import module, the second trace data having the incompatible second trace format from the second trace data provider into a file system for temporary storage prior to the conversion; and transporting the second trace data having the converted second trace format to a database having the first trace data.

6. The system of claim 4, wherein the first programming engine comprises a Java 2 Enterprise Edition (J2EE) engine, and the second programming engine comprises an Advanced Business Application Programming (ABAP) engine.

7. An article of manufacture comprising a machine-accessible storage medium having instructions which, when executed, cause a machine to:

receive a request for a first trace data having a first trace format and associated with a first programming engine that is associated with first trace activities at a first computer system, and a second trace data having a second trace data format and associated with a second programming engine that is associated with second trace activities at a second computer system, the first format being compatible with a common trace data format, wherein the second trace format is incompatible with and independent of the first trace format and the common trace data format, and wherein the first programming engine is incompatible with and independent of the second programming engine, wherein the common trace data format comprises a trace format that is designated as the common trace data format, the trace format including a common performance trace (CPT) format, wherein the (CPT) format includes a common interface model (CIM)-compliant format and provides the common trace data format defining a type of data that is needed to analyze performance;

analyze the second trace data format of the second trace data for conversion to the common trace data format by determining, compatibility or incompatibility of the second trace data with the common trace data format, wherein determining is performed based on correlators provided by a trace service, wherein the correlators include a first correlator containing engine information relating to the second programming engine, and a second correlator serving as a main correlator to group up trace records belonging to one or more traces;

convert the second trace format of the second trace data such that the second trace format is compatible with the common trace data format, wherein converting includes updating the trace service by replacing common trace data format-incompatible trace functionalities of the trace service with common trace data format-compatible trace functionalities;

integrate the first trace data having the first trace format with the second trace data having the converted second trace format; and provide access to the integrated first and second trace data.

8. The article of manufacture of claim 7, wherein the instructions which when executed further cause the machine to: identify second trace format of the second trace data being incompatible with the common trace data format;

import, via an import module, the second trace data having the incompatible second trace format from the second trace data provider into a file system for temporary storage prior to the conversion; and transporting the second trace data having the converted second trace data format to a database having the first trace data.

9. The article of manufacture of claim 7, wherein the first programming engine comprises a Java 2 Enterprise Edition (J2EE) engine, and the second programming engine comprises an Advanced Business Application Programming (ABAP) engine.

* * * * *